United States Patent
Del Rio et al.

(10) Patent No.: US 10,883,512 B2
(45) Date of Patent: Jan. 5, 2021

(54) FAN ROTATABLY CONNECTED TO A DRIVE SHAFT BY MEANS OF A MELTABLE ELEMENT

(71) Applicant: SAFRAN ELECTRICAL & POWER, Blagnac (FR)

(72) Inventors: Fabien Del Rio, Blagnac (FR); Frederic Garcia, Blagnac (FR); Francois Gauharou, Blagnac (FR); Rene Salvador, Blagnac (FR)

(73) Assignee: SAFRAN ELECTRONICS & POWER, Blagnac (FR)

(*) Notice: Subject to any disclaimer, the term of this patent is extended or adjusted under 35 U.S.C. 154(b) by 0 days.

(21) Appl. No.: 15/760,220

(22) PCT Filed: Sep. 9, 2016

(86) PCT No.: PCT/FR2016/052264
§ 371 (c)(1),
(2) Date: Mar. 14, 2018

(87) PCT Pub. No.: WO2017/046490
PCT Pub. Date: Mar. 23, 2017

(65) Prior Publication Data
US 2018/0266431 A1    Sep. 20, 2018

(30) Foreign Application Priority Data

Sep. 17, 2015 (FR) ........................... 15 58750

(51) Int. Cl.
*F04D 29/26* (2006.01)
*F16D 9/08* (2006.01)
*F16D 1/08* (2006.01)

(52) U.S. Cl.
CPC ............. *F04D 29/263* (2013.01); *F16D 9/08* (2013.01); *F05D 2260/311* (2013.01); *F16D 1/0894* (2013.01)

(58) Field of Classification Search
CPC .... F04D 29/263; F04D 29/20; F04D 29/2294; F04D 29/266; F16D 9/08; F16D 1/0894; F05D 2260/311; F05B 2260/3011
See application file for complete search history.

(56) References Cited

U.S. PATENT DOCUMENTS 4,193,741 A * 3/1980 Briggs .................. F01D 21/045
                                                    416/170 R
6,183,208 B1 * 2/2001 Qandil .................... F04D 13/08
                                                       417/201
(Continued)

FOREIGN PATENT DOCUMENTS

| EP | 0590794 | 4/1994 |
|---|---|---|
| GB | 2334553 | 8/1999 |
| WO | WO-2016097529 | 6/2016 |

OTHER PUBLICATIONS

"International search report," PCT Application No. PCT/FR2016/052264 (dated Dec. 20, 2016).

*Primary Examiner* — David E Sosnowski
*Assistant Examiner* — Danielle M. Christensen
(74) *Attorney, Agent, or Firm* — Womble Bond Dickinson (US) LLP

(57) ABSTRACT

The invention relates to a fan, in particular for an aircraft cooling unit, comprising a wheel (128) and a shaft line (136) for driving the wheel about an axis (A), said wheel including a hub (138) supporting an annular row of blades (140), and means (142) for connection to said shaft line that are housed inside said hub. The fan is characterized in that the connection means include at least one meltable safety element (158) designed to be broken and to rotationally disengage at (Continued)

least a portion of the connection means from the shaft line when a torque for driving the wheel that is transmitted by the shaft line exceeds a specific threshold.

8 Claims, 4 Drawing Sheets

(56) References Cited

U.S. PATENT DOCUMENTS

| | | | | |
|---|---|---|---|---|
| 6,333,579 | B1* | 12/2001 | Hirano | H02K 1/146 |
| | | | | 310/194 |
| 6,434,968 | B2* | 8/2002 | Buchholz | B64D 13/00 |
| | | | | 62/401 |
| 9,735,653 | B2* | 8/2017 | Endo | H02K 1/32 |
| 9,815,374 | B2* | 11/2017 | Widmer | B60L 7/02 |
| 10,240,609 | B2* | 3/2019 | Kobayashi | F04D 29/063 |
| 2014/0112809 | A1 | 4/2014 | Kim | |
| 2017/0343052 | A1* | 11/2017 | Cladiere | F16D 9/06 |

\* cited by examiner

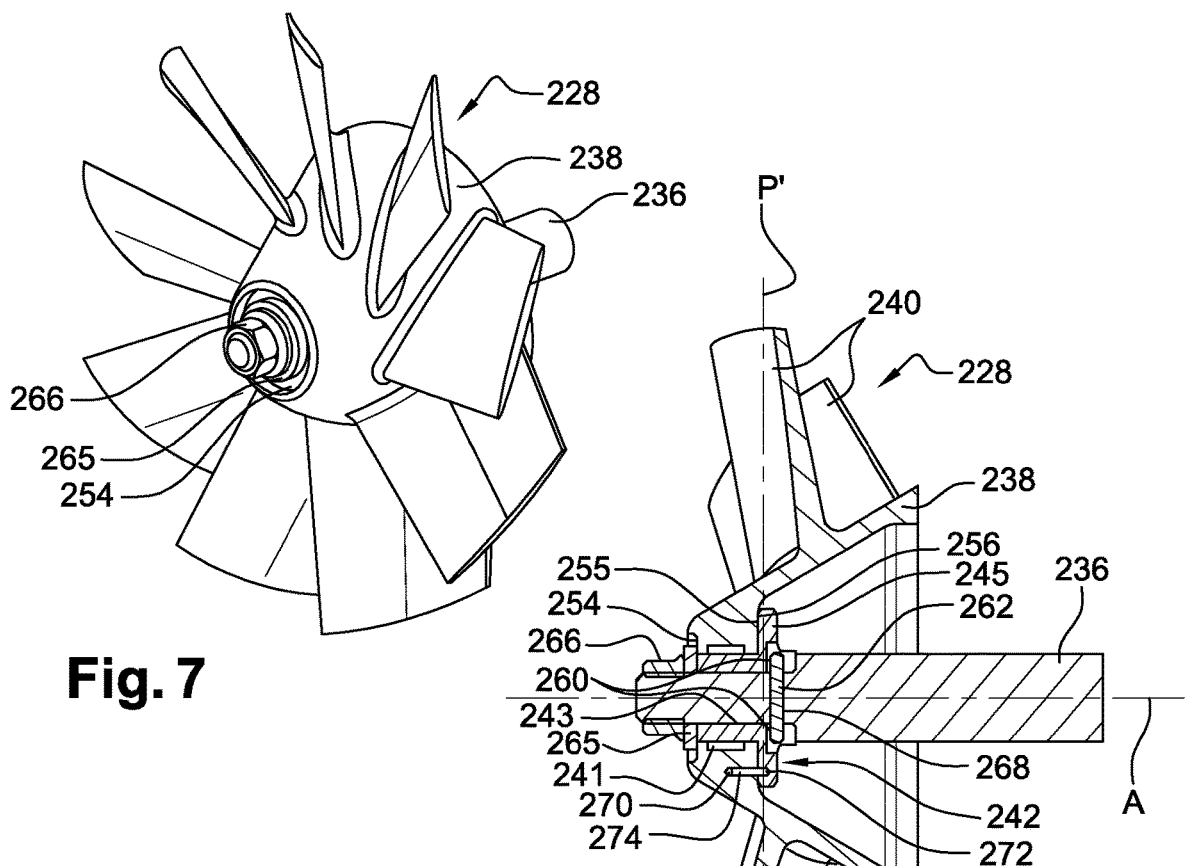
Fig. 7
Fig. 8
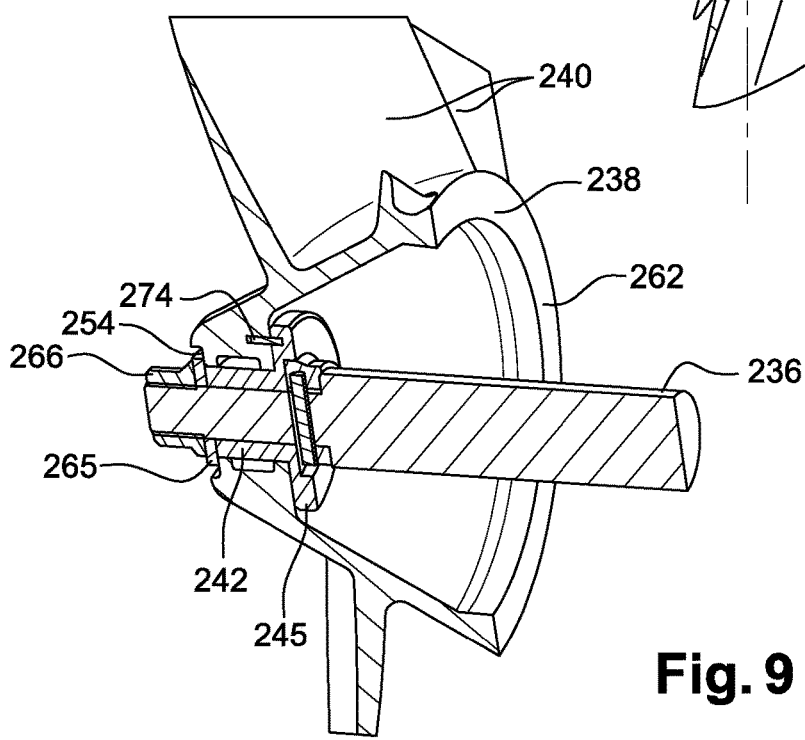
Fig. 9

FAN ROTATABLY CONNECTED TO A DRIVE SHAFT BY MEANS OF A MELTABLE ELEMENT

TECHNICAL FIELD

The present invention notably relates to a fan, in particular for an aircraft cooling unit.

PRIOR ART

The prior art notably comprises documents GB-A-2 334 553 and US-A1-2014/112809.

Aircraft engines are equipped with cooling units for fluids such as oil for example. An oil cooling unit of the prior art comprises an air-oil exchanger and a fan that is intended to draw air through the exchanger.

The exchanger is generally of the "brick" type and the fan comprises a wheel that is arranged beside the exchanger and aspirates air through it so that the air takes heat energy from the oil circulating in the exchanger.

The fan is a mechanical fan and its wheel is caused to rotate by a shaft line that is connected to an output shaft of a gearbox or to mechanical off-take means on the engine of the aircraft.

Engine manufacturers and/or helicopter manufacturers may require that, if there is a problem at the level of the fan wheel, such as blocking of the wheel or ingestion of a foreign body into the fan, increase in the drive torque of the wheel beyond a certain threshold lead to controlled breakage of a component in order to decouple or rotationally disengage the fan wheel from the output shaft of the gearbox or of the mechanical off-take means on the engine.

In current technology, this safety function is provided on the shaft line driving the fan wheel. The shaft line comprises a section that has a fusible portion that is intended to break if the torque transmitted to the wheel exceeds a certain threshold. This section is called a "shear shaft" since this is what is intended to break in the aforementioned case.

In addition to this shear shaft, the shaft line comprises several elements (main shaft, sleeve, bearings, flange, preload washer, etc.) and is therefore relatively complex. The shear shaft forms an intermediate component that leads to offset of the wheel with respect to the output shaft and requires guiding of the shaft line by bearings and associated parts. Although this complexity is not demanded by the customer, it is necessary for incorporating the safety function. The shaft line is therefore expensive and is of considerable weight. Moreover, the presence of the bearings decreases the reliability and service life of the fan.

SUMMARY OF THE INVENTION

The present invention proposes a simple, effective and economical solution to the aforementioned problem.

The invention proposes a fan, in particular for an aircraft cooling unit, comprising a wheel and a shaft line that drives the wheel about an axis, said wheel comprising:
  a hub carrying an annular row of blades, and
  means for connection to said shaft line, which are housed inside said hub, said connection means comprising a bush with an internal bore configured for receiving said shaft, said bush being located approximately in a plane transverse to said axis or is traversed by said plane, which passes approximately through said blades, characterized in that said connection means comprise at least one fusible safety element that extends or is arranged around said axis and is configured to break and rotationally disengage at least part of said means of said shaft line when a wheel driving torque transmitted by said shaft line exceeds a certain threshold, said at least one fusible element having an elongated shape, its extension axis being parallel to said axis.

The invention thus proposes to provide the safety function on the fan wheel rather than on the shaft line driving this wheel. The shaft line can thus be simplified and can be less expensive and lighter than that of the prior art. This makes it possible to reduce the cost of the fan but also increase its reliability. The fan wheel therefore incorporates a fusible element allowing decoupling of the wheel from the shaft line when the torque transmitted by the shaft or the shaft line exceeds a predetermined threshold.

The nominal torque to be transmitted by the fusible element of the wheel is preferably between 1 and 15 N.m. The rupture threshold may represent ten times the nominal torque, and be of the order of 10 to 150 N.m.

The fan according to the invention may comprise one or more of the following features, taken in isolation from one another or in combination with one another:
  said at least one fusible element is located approximately in a plane transverse to said axis or is traversed by said plane, which passes approximately through said blades,
  said bush is mounted in a central hole in the hub and is rotationally integral with the hub owing to said fusible element, such as one or more fusible needles,
  said bush comprises an outer annular flange applied against a transverse face of said hub, said at least one fusible element being mounted in respective blind holes in said flange and in said hub,
  said bush comprises at least one transverse slot configured for receiving a pin for rotationally integrating the bush with said shaft,
  said at least one fusible element comprises one or more fusible needles, and
  the wheel is of the squirrel cage type, axial, centrifugal, or mixed.

The invention further relates to an aircraft cooling unit, comprising a heat exchanger, for example air-oil, and a fan as described above.

The invention also relates to an engine or a gearbox for an aircraft, such as a helicopter, comprising an output shaft and a cooling unit as described above, the wheel of which is driven by said output shaft.

The present invention finally relates to an aircraft, comprising at least one cooling unit or an engine or a gearbox as described above.

DESCRIPTION OF THE FIGURES

The invention will be better understood and other details, features and advantages of the invention will become clearer on reading the following description provided as a non-limiting example, referring to the appended drawings, in which:

FIGS. 7 to 9 represent the embodiment of the invention, FIG. 7 being a schematic perspective view of a fan wheel and of a drive shaft, and FIGS. 8 and 9 being schematic views in axial section and in perspective of the wheel and of the shaft.

DETAILED DESCRIPTION

Figure 1:
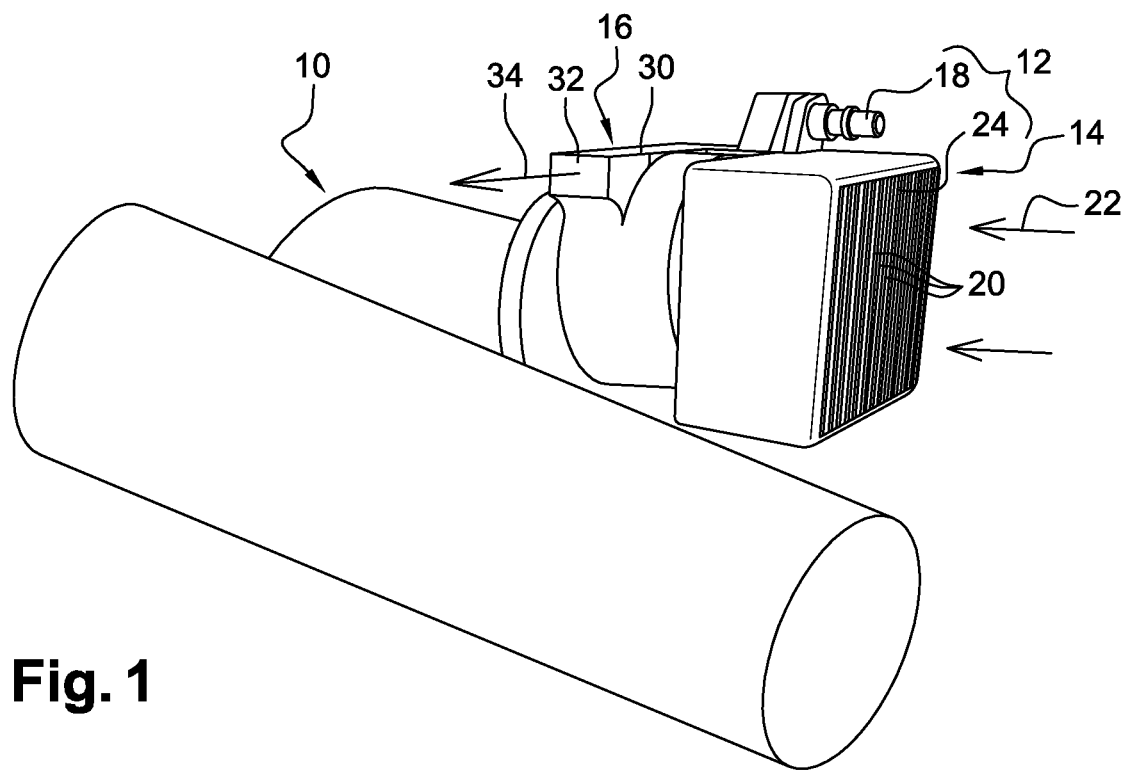
FIG. 1 is a schematic perspective view of an aircraft engine equipped with a cooling unit.

FIG. 1 shows an engine 10 of an aircraft, here of a helicopter, which is equipped with an engine oil cooling unit 12. The unit 12 comprises an air-oil heat exchanger 14 and a fan 16, which can be seen more clearly in FIG. 2.

The heat exchanger 14 is of the "brick" type and is of parallelepipedal shape. It comprises an oil circuit connected to oil supply and draining ports 18, just one of which can be seen in FIG. 1. It further comprises fins 20 defining surfaces for heat exchange with an air stream passing through the exchanger (arrow 22). The front or inlet section 24 of the exchanger is in the shape of a parallelogram. The outlet section (not visible) of the exchanger is also of parallelogram shape. A connecting pipe is mounted between the outlet section of the exchanger and the intake or inlet section 26 of the fan and provides fluid communication between these sections.

The fan 16 is in this case of the centrifugal type and comprises a wheel 28 that is driven by a shaft line 36 for forcing the air to be aspirated through the exchanger 14 and to sweep over the fins 20. The aspirated air passes through the wheel and is expelled radially to the exterior. It is channeled through the body 30 of the fan which forms a volute whose air outlet 32 has an approximately tangential orientation (arrow 34) relative to a circumference centred on the rotation axis of the wheel.

As can be seen in FIG. 1, the exchanger 14 and the fan 16 are arranged beside one another. The body 30 of the fan is fixed on a casing of the engine and the exchanger 14 is generally fixed cantilevered on the fan (or directly on the engine or the gearbox).

Figure 3:
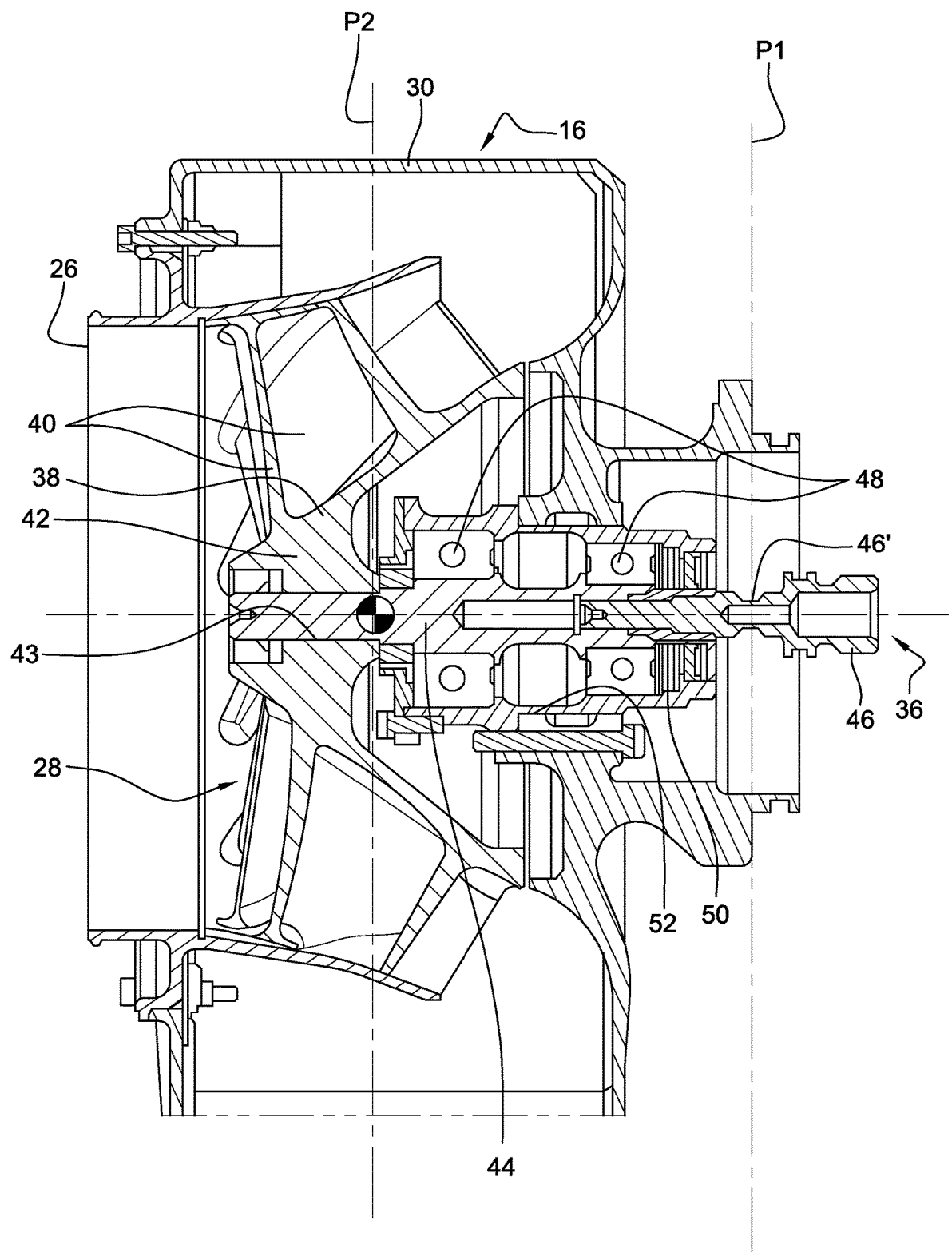
FIG. 3 is a schematic partial view in axial section of the fan in FIG. 2, and represents the art prior to the present invention.

The wheel 28 of the fan 16 and the shaft line 36 driving the wheel 28 can be seen more clearly in FIG. 3.

The wheel 28 comprises a hub 38 carrying an annular row of blades 40 at its periphery. It also comprises connection means 42 to the shaft line 36. These connection means 42 are housed in the hub 38 and in this case are formed as a single piece with the latter. The connection means comprise a bore 43 passing through and extending along the rotation axis A of the wheel. The blades 40 are also formed as a single piece with the hub 38. The wheel 28 is thus monobloc.

The shaft line 36 comprises several elements: a main shaft 44, a second shaft or shaft section called "shear shaft" 46, bearings 48, a sleeve 50, and associated parts such as a flange, a pre-load washer, screws and bolts, etc.

The main shaft 44 comprises an end that passes through the bore 43 and comprises means for rotational coupling that interact with the connection means 42 of the wheel 28.

The opposite end of the main shaft 44 receives one end of the shear shaft 46 which comprises a portion 46' of smaller diameter forming a fusible portion of the aforementioned type. This portion 46' extends in a plane P1, radial or transverse relative to the rotation axis of the wheel 28, which is remote from a parallel plane P2 passing approximately through the blades 40 of the fan wheel.

The main shaft 44 is centred and guided rotationally by the bearings 48 in the sleeve 50 which surrounds a part of the section 44 and of the shear shaft 46 and which is mounted in a hole 52 in the body 30 of the fan 16.

As explained in the foregoing, this technology is complex and has drawbacks connected with the fact that the safety function is provided on the shaft line 36 by means of the shear shaft 46.

The invention supplies a solution based on a fan shear wheel, which replaces the shear shaft and makes it possible to simplify the shaft line driving the fan wheel.

Figure 4:
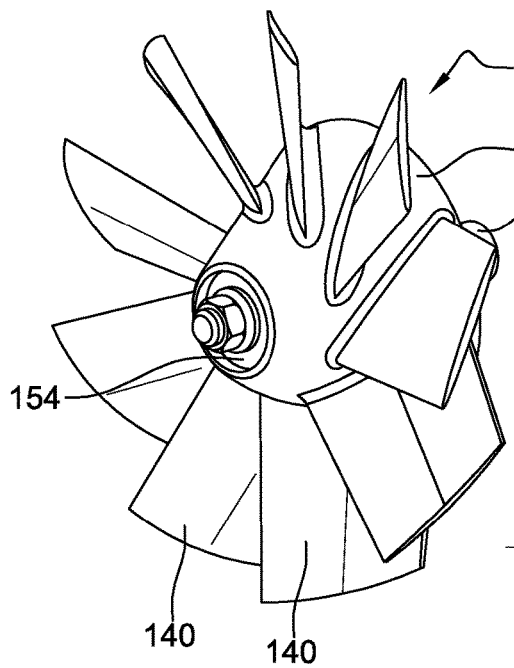
FIGS. 4 to 6 represent one embodiment, FIG. 4 being a schematic perspective view of a fan wheel and of a drive shaft, and FIGS. 5 and 6 being schematic views in axial section and in perspective of the wheel and of the shaft.
Figure 5:
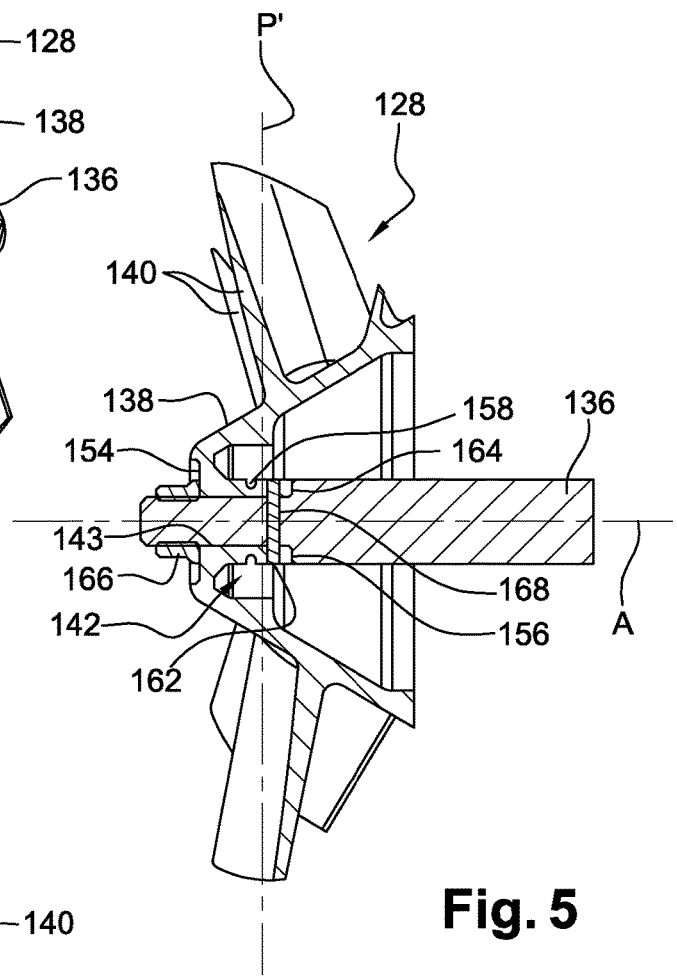
Figure 6:
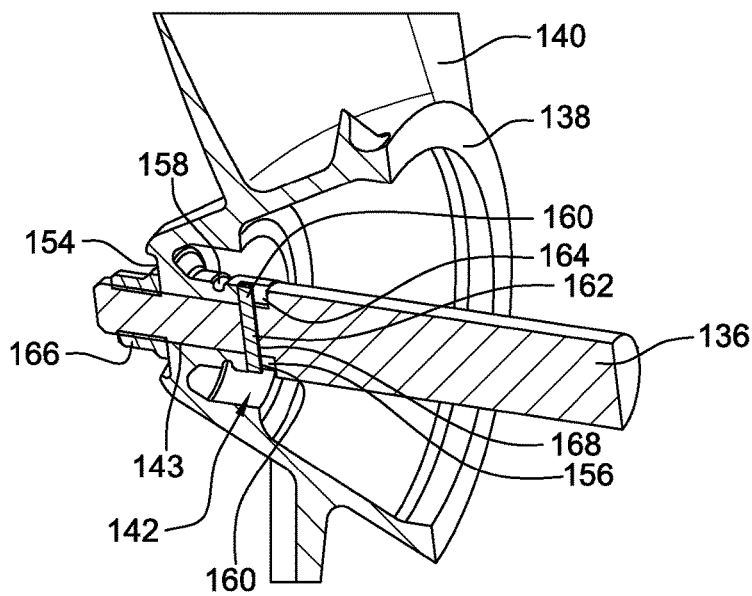

FIGS. 4 to 6 show one embodiment. These figures show a fan wheel 128 and its drive shaft line, which may essentially comprise a drive shaft 136.

Figure 2:
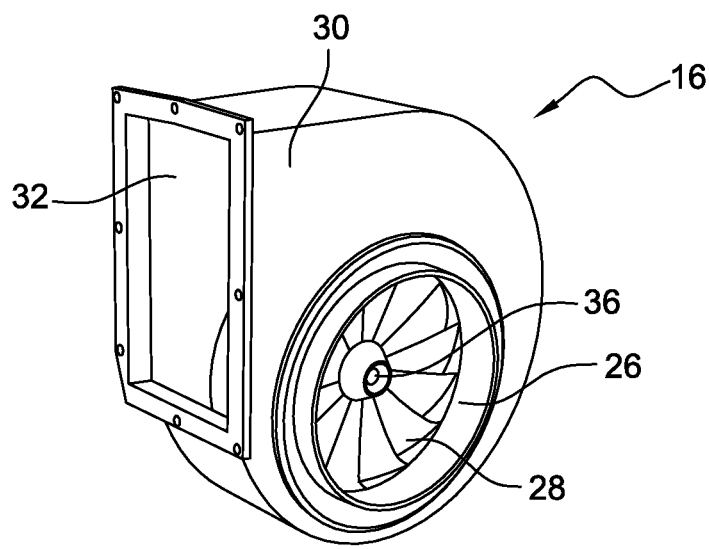
FIG. 2 is a schematic perspective view of the fan of the cooling unit in FIG. 1.

Although the rest of the fan is not described hereunder, reference may be made to the features of the fan described in the foregoing and shown in FIGS. 1 to 3 for an example of integration of the wheel according to the invention.

The wheel 128 comprises a hub 138 carrying an annular row of blades 140 at its periphery. It also comprises means 142 for connection to the shaft 136. These connection means comprise a bush 142 that extends along the rotation axis A of the wheel. The hub 138 comprises a wall approximately in the shape of a truncated cone and the bush 142 is housed in the hub, in this case in the vicinity of its end with a smaller diameter.

The bush 142, the blades 140 and the hub 138 are formed as a single piece. The wheel 128 is therefore monobloc.

The bush 142 has a cylindrical and tubular general shape and comprises a cylindrical internal bore 143 along axis A. This bore 143 passes axially through the bush 142 and opens out at the centre of the hub, at its end with smaller diameter. At this end, the bush or the hub defines a face 154 that is radial or transverse relative to the axis A.

The bush 142 extends over part of the axial dimension of the hub (between 20 and 50% of its length in the example shown).

The axial end of the bush 142 is opposite said face 154, which is free and forms a radial face 156 as a stop for the shaft 136.

Away from its axial ends, the bush 142 comprises an annular groove 158 on its outer periphery. This groove creates a local decrease in radial thickness of the bush 142 and therefore a local mechanical weakening of the bush. This groove 158 thus defines a fusible portion of the bush. The mechanical strength of this fusible portion will be determined as a function of the torque threshold, starting from which decoupling or rotational separation of the wheel 128 with respect to the shaft 136 is desirable on grounds of safety, and can be calculated by a person skilled in the art. The groove 158 extends in a transverse plane P passing approximately through the blades 140.

In the example shown, the groove 158 is located approximately midway between the faces 154, 156. Between the groove 158 and the face 156, the bush comprises a transverse slot 160 extending approximately over half the cross-section of the bush. This slot 160 receives a cylindrical pin 162 for rotationally coupling the wheel 128 to the shaft 136.

The shaft 136 comprises two cylindrical portions with different diameters, which are joined together by a cylindrical shoulder 164. The portion of the shaft 136 with smaller diameter is inserted in the bush 142 and passes through it until the shoulder 164 comes up against the face 156 of the bush 142. The free end of this shaft portion comprises an external thread for screwing a nut 166 that is intended to bear on the face 154. Simple support is sufficient, as the nut is not intended to clamp the shaft 136 and the wheel axially. Rotational coupling of the wheel 128 and the shaft 136 is provided by the pin 162, which is inserted in the slot 160 of the bush 142 and in a hole 168 in the smaller-diameter portion of the shaft 136. The hole 168 preferably has a diameter approximately identical to that of the pin 162.

The pin 162 is centred on either side of the shaft (force fit) and then the bush is positioned on the shaft (sliding fit), taking care to align the pin with the slot 160 to bring the face 156 properly in contact on the shoulder of the shaft.

When a torque transmitted by the shaft 136 is above the predetermined threshold, the bush 142 will break at the level of the groove 158 and divide into two axial parts, a first part that stays connected to the hub 138 and a second part that stays connected to the shaft by the pin 162. The nut 166 is not tightened and does not participate in the rotational coupling of the wheel, which therefore becomes free to rotate on the shaft 136 once the bush is broken. The nut 166 allows the wheel 128 to be held in place axially after breakage of the bush 142.

For example, the wheel 128 is made of aluminium and the shaft 138 is made of steel.

After breakage of the bush 142, the shaft 136 can still be rotated for a certain length of time, for example one or two hours. Owing to the speed difference between the shaft 136 and the wheel 128, heating of the components may occur and cause binding of the bush 142 on the smaller-diameter portion of the shaft 136, in particular in the above example where they are of different materials. To prevent this phenomenon, this shaft portion may be treated with an anti-binding coating.

FIGS. 7 to 9 show how the invention is implemented. These figures also show a fan wheel 228 and its drive shaft line, which may essentially comprise a drive shaft 236. As in the preceding embodiment, although the rest of the fan is not described hereunder, reference may be made to the features of the fan described with reference to FIGS. 1 to 3 for an example of integration of the wheel according to the invention.

The wheel 228 comprises a hub 238 carrying an annular row of blades 240 at its periphery. It also comprises means 242 for connection to the shaft 236. These connection means comprise a bush 242 that extends along the rotation axis A of the wheel. The hub 238 comprises a wall approximately in the shape of a truncated cone and the bush 242 is housed in the hub, in this case in the vicinity of its end with a smaller diameter.

The blades 240 and the hub 238 are formed as a single piece and the bush 242 is inserted in a central hole 241 of the hub, which is aligned on the axis A. This hole 241 passes axially through the hub 238 and opens out at one end onto a first radial face 254 of the hub and at an opposite end, located inside the hub, on a second radial face 256.

The bush 242 has a cylindrical and tubular general shape and comprises a cylindrical internal bore 243 along axis A. This bore passes axially through the bush 242. The bush 242 further comprises an outer annular flange 245 intended to be applied axially against the face 256 of the hub.

The flange 245 is in this case located near an axial end of the bush 242. In the assembled position of the bush 242 in the hole 241 of the hub, the axial end of the bush located at a distance from the flange is slightly retracted relative to the face 254, towards the interior of the hub, and its opposite axial end (located nearest to the flange 245) forms a radial face 255 as a stop for the shaft 236.

In the vicinity of the flange 245, the bush 242 comprises a transverse slot 260 extending approximately over half the cross-section of the bush. This slot 260 receives a cylindrical pin 262 for rotational coupling of the bush 242 to the shaft 236.

The bush 242 extends on a portion of the axial dimension of the hub (between 20 and 50% of its length in the example shown).

The hub 238 comprises at least one blind hole 270 (or even several) which opens onto its face 256, i.e. beside the flange of the bush 242. This blind hole 270 has an elongated shape in a direction parallel to axis A.

The flange 245 of the bush 242 comprises, opposite the face 256, a blind hole 272 or even several. This blind hole 272 thus opens out on the annular lateral face of the flange that is intended to bear against the face 256. The blind hole 272 has an elongated shape in a direction parallel to axis A.

The blind holes 270, 272 have approximately the same diameter and are located on one and the same circumference centred on the axis A. They are intended to be aligned axially to receive a needle 274 for coupling or rotational integration of the bush 242 with the hub 238. The needle 274 has an elongated shape and extends along axis A.

This needle 274 thus forms a fusible element. The shear strength of this needle will be determined as a function of the torque threshold starting from which decoupling or rotational separation of the wheel with respect to the shaft is desirable on grounds of safety, and can be calculated by a person skilled in the art. The needle 274 is traversed by a transverse plane P' passing approximately through the blades 240.

When several blind holes 270, for example three, are aligned with blind holes 272, a needle 274 is housed in each pair of blind holes 270, 272 (i.e. three needles in the aforementioned example).

The shaft 236 comprises two cylindrical portions with different diameters that are joined together by a cylindrical shoulder 264. The portion of the shaft 236 of smaller diameter is inserted in the bush 242 and passes through it until the shoulder 264 comes up against the face 255 of the bush 242. The free end of this shaft portion comprises an external thread for screwing a nut 266 which is intended to bear on the face 254, for example by means of a washer 265, separated by an axial clearance of the bush 242. Rotational coupling of the wheel 228 and the shaft 236 is provided by the pin 262 which is inserted in the holes 260 of the bush 242 and in a hole 268 of the smaller-diameter portion of the shaft 236. The pin 262 is housed in the holes 260, 268 before screwing on the nut 266. The shaft 236, the bush 242 and the pin 262 may be assembled before the whole is inserted in the hub.

When a torque transmitted by the shaft 236 is greater than the predetermined threshold, the needle will break in the plane P' and separate into two parts, a first part that stays inserted in the blind hole 270 of the hub 238 and a second part that stays inserted in the blind hole 272 of the flange 245 of the bush 242. The nut 266 is not tightened and does not participate in rotational coupling of the wheel, which therefore becomes free to rotate on the bush 242 once the needle 274 is broken. The nut 266 makes it possible to hold the wheel 228 in place axially after breakage of the needle 262.

For example, the hub 238 and the blades 240 are made of aluminium and the shaft 138 is made of steel. The bush 242 may be made of plastic or composite, so as to limit the aforementioned risk of binding on breakage of the needle. The needle 274 may be made of steel (for example 32CDV13, 100C6, Z100CD17) or of aluminium (for example 2024, 5086, 6061, 7000).

In the two embodiments of the invention described in the foregoing, the pin 162, 262 is designed to withstand the breaking torque of the wheel. The pin 162, 262 may be replaced with similar means such as splines. The shaft 136,

236 could for example comprise rectilinear splines at its outer periphery, engaged in complementary rectilinear splines of the bush 142, 242.

The choice of one or other of the embodiments described above may notably depend on the constraints on configuration of the wheel, the mechanical power to be transmitted (indirectly determining the dimensions of the fusible portion or element), the environment (notably vibratory), etc.

The invention claimed is:

1. A fan for an aircraft cooling unit, comprising a wheel and a shaft line that drives the wheel about an axis (A), said wheel comprising:
    a hub carrying an annular row of blades, and
    means for connection to said shaft line, which are housed inside said hub, said means for connection comprising a bush comprising an internal bore configured for receiving said shaft line, said bush being located in a plane (P, P') transverse to said axis or is traversed by said plane, which passes through said blades,
    wherein said means for connection comprise at least one fusible safety element which extends or is arranged around said axis (A) and which is configured to break and rotationally disengage at least one part of said means for connection of said shaft line when a drive torque of the wheel transmitted by said shaft line exceeds a certain threshold, said at least one fusible safety element having an elongated shape, its extension axis being parallel to said axis (A) and wherein the shaft comprises two cylindrical portions with different diameters, the portion of the shaft with the smaller diameter being inserted in the bush and its free end comprising an external thread for screwing a nut intended to bear on a face of the bush.

2. The fan according to claim 1, wherein said at least one fusible safety element is located in a plane (P, P') transverse to said axis (A) or is traversed by said plane, which passes through said blades.

3. The fan according to claim 1, wherein said bush is mounted in a central hole of the hub and is rotationally integral with the hub owing to said at least one fusible safety element.

4. The fan according to claim 3, wherein said bush comprises an outer annular flange applied against a transverse face of said hub, said at least one fusible safety element being mounted in respective blind holes of said flange and of said hub.

5. The fan according to claim 1, wherein said bush comprises at least one transverse slot configured for receiving a pin for rotational integration of the bush with said shaft line.

6. The fan according claim 1, wherein said at least one fusible safety element comprises one or more fusible needles.

7. The fan according to claim 1, wherein said wheel (128, 228) is, axial, centrifugal, or mixed.

8. Aircraft cooling unit, comprising a heat exchanger and the fan according to claim 1.

* * * * *